(12) United States Patent
Pong et al.

(10) Patent No.: US 6,728,843 B1
(45) Date of Patent: Apr. 27, 2004

(54) SYSTEM AND METHOD FOR TRACKING AND PROCESSING PARALLEL COHERENT MEMORY ACCESSES

(75) Inventors: Fong Pong, Mountain View, CA (US); Tung Nguyen, Cupertino, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 09/451,499

(22) Filed: Nov. 30, 1999

(51) Int. Cl.[7] ............................................. G06F 12/00
(52) U.S. Cl. ..................... 711/150; 711/168; 711/156
(58) Field of Search ............................. 711/150, 120, 711/168, 144, 145, 156, 154, 167

(56) References Cited

U.S. PATENT DOCUMENTS

| | | | | |
|---|---|---|---|---|
| 5,210,836 A | * | 5/1993 | Childers et al. | 712/241 |
| 5,548,775 A | * | 8/1996 | Hershey | 711/109 |
| 5,581,777 A | * | 12/1996 | Kim et al. | 712/16 |
| 5,983,328 A | * | 11/1999 | Potts et al. | 711/157 |
| 6,237,066 B1 | * | 5/2001 | Pan et al. | 711/149 |

* cited by examiner

Primary Examiner—Matthew Kim
Assistant Examiner—Matthew D. Anderson

(57) ABSTRACT

A system and method for processing multiple main memory accesses in parallel includes transmitting from the processor to the system control unit a first and a second transaction. These transactions are decoded to determine their corresponding commands and addresses. The system control unit includes a qualifier and a scheduler that assigns each transaction to a particular finite state machine (FSM). Each FSM executes a single transaction until completed. Each FSM machine maintains a record or keeps track of the state of progress of a transaction that is being executed by the system control unit. The FSMs keep track of the data by storing the data, such as the current state of the transaction, the status of the data, and an identifier describing which processor issued the transaction, for each transaction in a data buffer. The data value corresponding to a particular transaction may be retrieved from the main memory using a FSM. Since a different FSM is used to retrieve data values, the execution of these transactions can be performed in parallel. Parallel processing of memory accesses using FSMs enhances the speed and efficiency of computer systems.

20 Claims, 2 Drawing Sheets

SYSTEM AND METHOD FOR TRACKING AND PROCESSING PARALLEL COHERENT MEMORY ACCESSES

BACKGROUND OF THE INVENTION

1. Field of Invention

The present invention relates to the field of computer systems. More particularly, this invention relates to a system control unit that processes multiple coherent memory accesses in parallel.

2. Description of Related Art

Computer systems typically include a memory and a processor. The memory generally includes a main memory and a cache memory for storing data and instructions for the processor. The cache memory in the processor may include one or more caches that may be "split," i.e. separate caches for instructions and data addresses, or "unified," i.e., a single cache for both instructions and data, or a combination of the two. The cache memories store blocks of data and/or instructions that are received from the main memory. Typically, instructions from the main memory that are used by the processor are stored in the instruction cache. In addition, the data for that particular instruction is stored in the data cache.

When the processor requests data from the main memory, it takes much longer for the processor to receive the data than it does when it requests the data from the cache memory. Thus, when accessing data from the main memory, the processor may require additional clock cycles to retrieve the data. The additional clock cycles increase the amount of time required by the processor to complete a particular transaction. The speed of the computer system is further reduced when the processor has to access multiple data values from the main memory. Further, if a transaction that the processor is executing takes extra clock cycles to execute, the processor must wait until the transaction is complete before executing another transaction. Hence, the processor executes transactions one instruction at a time. For example, the instructions x=y+1 and z=w+10 each may take approximately 5 cycles to execute. Therefore, the total processor time to execute these two instruction is 10 cycles. In this example, the processor retrieves the value for y and executes the x=y+1 transaction before the processor retrieves the value for w and executes the z=w+10 transaction. Executing instructions one at a time is inefficient because some instructions can be processed independent of other instructions.

It should therefore be appreciated that there remains a need for a computer system that performs multiple coherent memory accesses in parallel. The present invention fulfills this need.

SUMMARY OF THE INVENTION

The present invention is embodied in a computer system, and related method, that includes a system control unit that accesses information from multiple coherent memories for processing in parallel. The computer system includes a number of processors that issue transactions and a number of main memories configured to store information. Each partition of memories is attached to a system control unit, designated as the home system control unit for that memory partition. Each system control unit is composed of a number of finite state machines (FSMs) that receive the transactions from the processors and execute the transactions in parallel. The transactions may include transmitting requests to other system control units for accesses to their memories and processing requests from the home or other system control units for accesses to its own memory partition.

The method of processing multiple coherent memory accesses in parallel includes the system control unit receiving a transaction from a processor. The system control unit decodes the transaction to determine the corresponding command and locality. The transaction may include command such as "read" or "write," along with an address specifying the memory location of the data. The system control unit further includes a qualifier that may deny or accept a request received from the processor and a scheduler that assigns each request and transaction to a particular FSM. Each FSM maintains a record or keeps track of the state of progress of a single transaction being executed by the system control unit and executes the transaction until completed. The FSMs keep track of each transaction by storing data related to the transaction, such as the current state of the transaction, the status of the data, and an identifier describing which processor issued the transaction, in a data buffer. Since a different FSM is used to perform each coherent memory access, multiple transactions can be performed in parallel. "In parallel" means that the transaction are being performed simultaneously or the transactions overlap in time. For example, two transactions are performed in parallel if there is a moment in time that the execution of the transactions overlap. Parallel processing of coherence memory accesses using multiple FSMs enhances the speed and efficiency of multi-processor system designs.

Other features and advantages of the present invention will be apparent from the detailed description that follows.

DESCRIPTION OF THE PREFERRED EMBODIMENT

Figure 1:
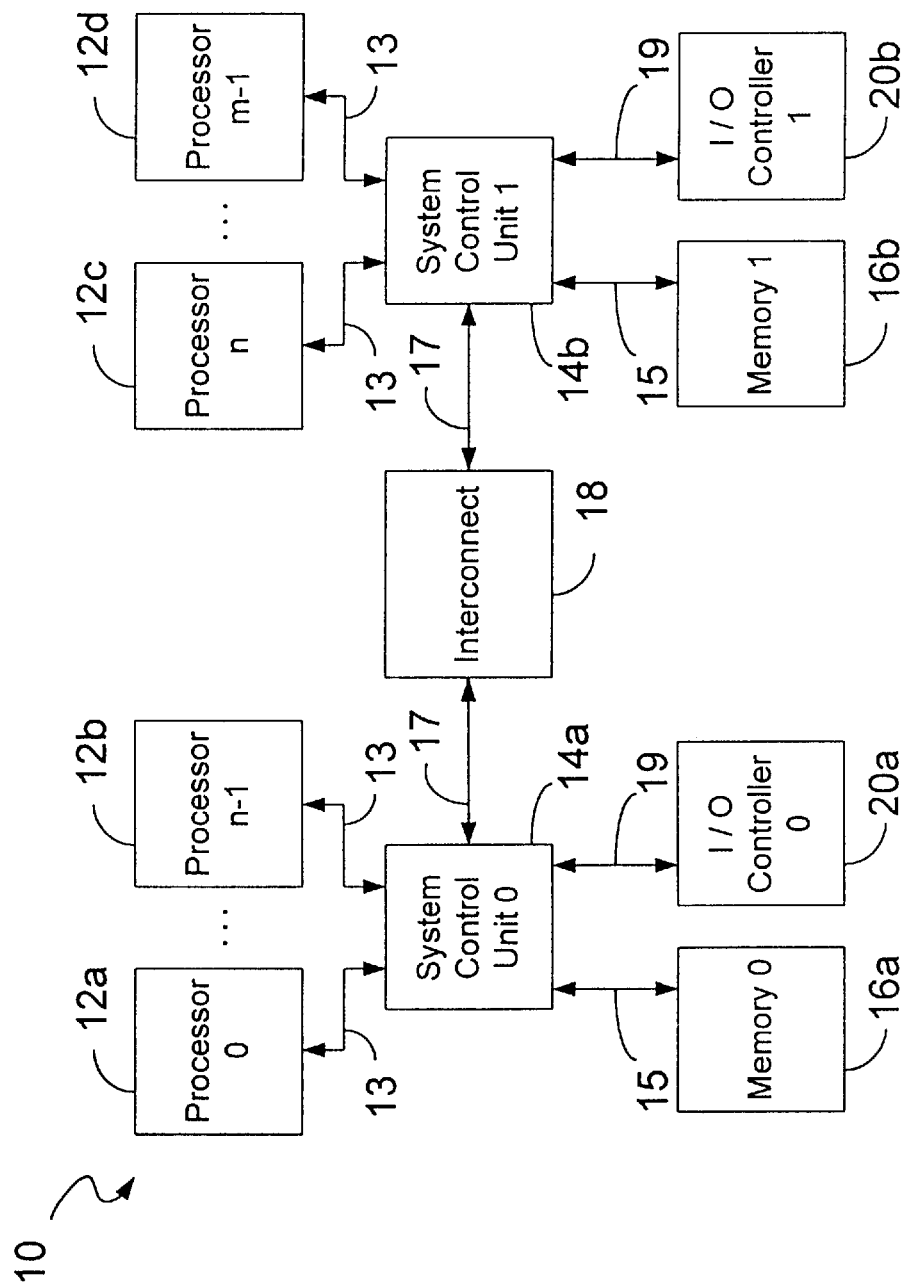
FIG. 1 is a block diagram of a computer system that processes multiple memory accesses in parallel using system control units.

With reference now to the illustrative drawings, and particularly to FIG. 1, there is shown a block diagram of a computer system 10 that processes multiple coherent memory accesses in parallel using system control units. The computer system of FIG. 1 is shown in simplified form where only two system control units are depicted. Typically, more than two system control units are connected to one another via interconnects in the manner shown in FIG. 1. For example, the computer system may include a hundred system control units along with the corresponding hardware as partially shown in FIG. 1. In addition, a number of processors (0 through n−1 and n through m−1, where n and m are positive integers) can be connected to each system control unit, respectively. One of ordinary skill in the art will be able to determine the number of processors and system control units to implement for a specific application that will optimize the processing speed and efficiency of the computer system.

The computer system, as shown in FIG. 1, has processors 12a, 12b, 12c, 12d, system control units 14a, 14b, memories 16a, 16b, interconnect 18, and input/output (I/O) controllers 20a, 20b. Each processor supports multiple coherent memory transactions. The processors are connected to the system control unit either via a common bus or independent point-to-point interfaces.

The processors 12 are connected to the system control units 14 via bus interfaces 13. The processor 12*a* issues transactions to the system control unit 14*a*, generally referred to as the requesting node or requesting system control unit. Alternatively, the transactions can be received from an I/O device coupled to the I/O controller 20*a*. The transactions include commands such as "read" or "write," along with an address corresponding to a particular memory location. The requesting system control unit decodes the transaction that was sent from the processor to determine whether the address is located in its local memory 16*a* or the address corresponds to a remote memory 16*b* whose access is controlled by a remote system control unit 14*b*. Each system control unit maintains a system memory map containing its local memory map and remote memory maps corresponding to other system control units. Hence, the decoding process can be accomplished by performing a look up transaction on the map. If the decoding process determines that the address is located in its local memory, the system control unit performs the transaction as requested and returns the result to the processor completing the transaction. When the address is located in its local memory, the system control unit is generally referred to as the home node or home system control unit. The system control unit 14*a* is connected to a main memory 16*a* via a memory interface 15.

If the decoding process determines that the address is not located in its local memory, the requesting system control unit forwards the transaction to the remote system control unit that owns the memory containing the address. This remote system control unit is generally referred to as the home node or home system control unit of the accessed memory location. A system interconnect 18 is used for communication between the system control units. Once the transaction is received, the remote system control unit performs the transaction as requested to its own local memory 16*b* and returns the result back to the requesting system control unit originating the transaction. In this example, it is the home system control unit 14*a*. In sum, the system control unit receives the transaction from the processor, performs a look up operation to locate the memory, accesses the memory corresponding to the transaction, and returns the result to the processor that issued the transaction.

The system control unit further includes an input/output (I/O) port 19 for connecting to an I/O controller 20*a* which is used to connect to an external device such as a printer or modem. The system control unit further supports coherent memory transactions originating from I/O devices, just as if they are coming from processors.

Figure 2:
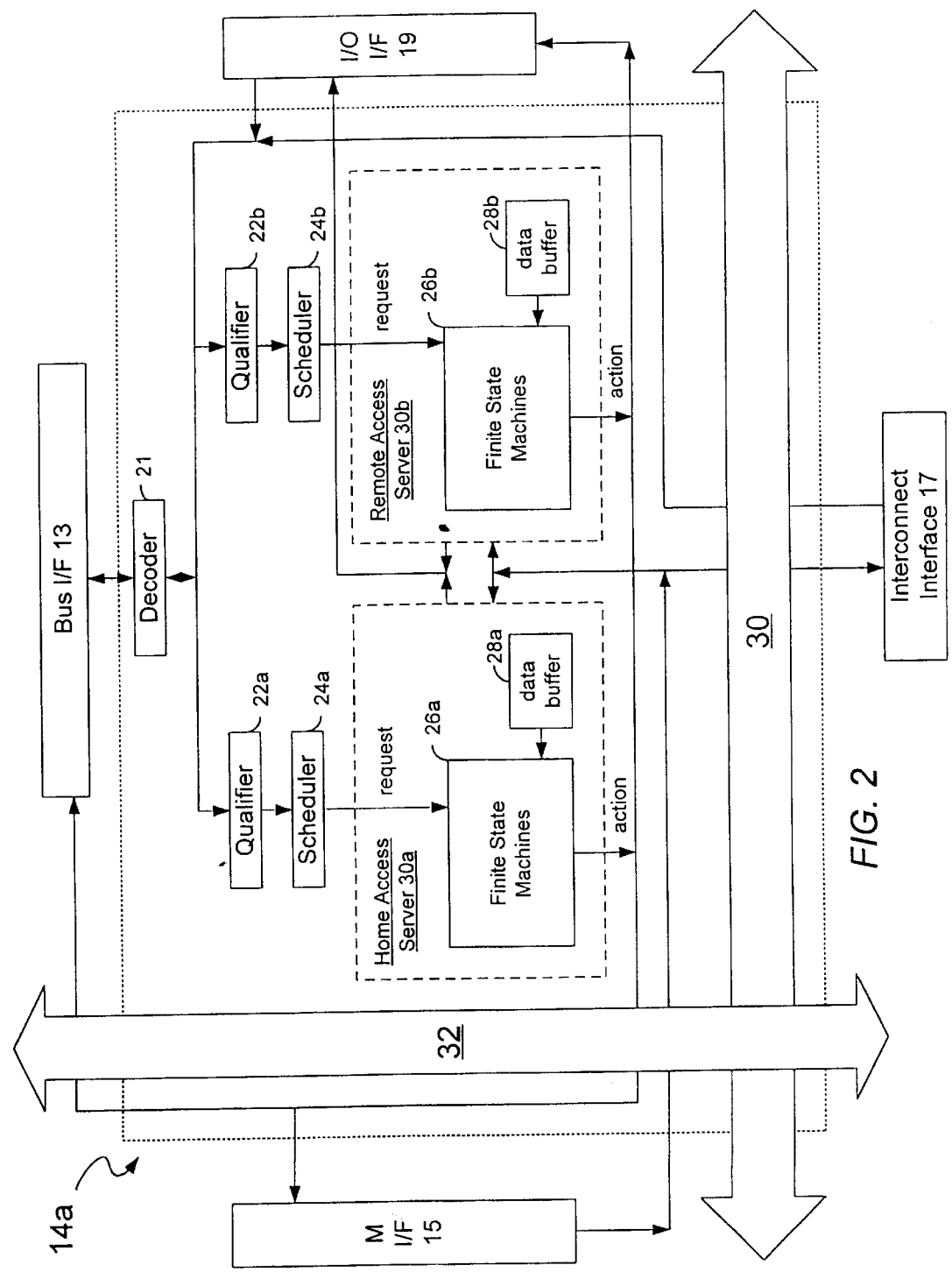
FIG. 2 is a block diagram of the system control unit of FIG. 1.

FIG. 2 is a block diagram of the system control unit 14*a* of FIG. 1. The system control unit typically includes a decoder 21, qualifiers 22*a*, 22*b*, schedulers 24*a*, 24*b*, a home access service 30*a*, and a remote access service 30*b*. The decoder 21 decodes the transaction that was sent from a processor 12 to determine a command and an address and whether the address is located in its local memory 16*a* or the address corresponds to a remote memory 16*b* that is controlled by a remote system control unit 14*b* (see also FIG. 1). If the address is located in its local memory 16*a*, the transaction is sent to qualifier 22*a*. If the address corresponds to a remote memory 16*b*, the transaction is sent to qualifier 22*b*. An identifier (discussed below) is also sent to the qualifier.

The processors 12 typically send a request along with the transaction to the qualifier to verify that it is capable of processing the transaction and to ensure that only one request for a particular transaction is processed at a time. For example, if a first processor requested the value of x, the qualifier would prevent a second processor from requesting that data until the first processor has completed the transaction. Hence, memory accesses to a particular memory location are ordered by the qualifier according to their priorities.

The qualifier can either deny or accept this request. The qualifier can deny the request by either returning a blocked signal or a rejected signal to the processor. A blocked signal indicates that the qualifier is unable to accept the pending transaction because there are no finite state machines (FSMs) 26*a* available to process the transaction. When the processor that sent the request receives a blocked signal, it may retry the request. If the processor receives a rejected signal, this notifies the processor that an error condition has occurred, for example the non-existence of the memory address sent as part of the transaction. The qualifier will not accept the request until it has an available FSM that can process the transaction. If the qualifier accepts the request, the address of the transaction is stored in the qualifier for validating subsequent requests and sent to a scheduler 24*a* to allocate an available FSM for processing the transaction. Hence, the qualifier also keeps track of whether there are any available FSMs to execute a transaction.

The scheduler 24*a* typically selects a FSM that is available to execute the transaction that it received from the qualifier. For efficient resource management, the FSMs are divided into groups correspond to the source and priority of the transaction. The FSMs can be re-assigned dynamically via firmware re-configuration to adapt to the changing workload. A number of FSMs are located within the home access service (HAS) 30*a* and the remote access service (RAS) 30*b*. The total number of FSMs 26*a* depends on the particular application and the HAS and the RAS can have a different number of FSMs. Once a FSM is selected, the scheduler assigns the transaction to that FSM. A different FSM is used to execute each transaction. Each FSM is assigned a transaction by the scheduler and continues executing that transaction until completion.

The exact number of qualifiers 22*a* and schedulers 24*a* per system control unit in a particular computer system depends on the particular application. One of ordinary skill in the art will be able to determine the number of qualifiers and schedulers to implement for a specific application to optimize the processing speed and efficiency of the system control unit. The qualifier and scheduler may be implemented in a single logic block. Therefore, it may be possible to qualify and schedule the request in the same clock cycle.

A FSM 26*a* is a multi-stage functional unit that keep track of the state of the transaction. Each FSM has a corresponding data buffer which stores data, such as the current state of the transaction, the status of the data, and an identifier describing which processor issued the transaction, for each pending transaction, e.g., memory access, received from the scheduler 24. The current state of the transaction indicates what step of the transaction has been completed. The status of the data indicates where the data is currently located. The identifier uniquely identifies each processor. Hence, each FSM is a dedicated resource that handles and monitors the progress of each transaction.

If the FSM is part of the HAS 30*a*, then the FSM 26*a* performs the transaction requested against its local memory and returns the result back to the originating processor completing the transaction. If the FSM is part of the RAS 30*b*, then the FSM 26*b* forwarded the transaction to the remote system control unit for execution on its behalf. The transaction is sent via the system interconnect. The request includes the identifier as well as a tag identifying the requesting system control unit that originated the transaction. When the remote system control unit receives the request, it will process the request as it were a local memory access using a FSM out of its HAS. In other words, the remote system control unit will be referred to as a home system control unit because it is performing a local memory access. Once the transaction is finished, the result is sent to the FSM of the originating or requesting system control unit RAS and the FSM proceeds to finish the transaction by returning the result to the originating processor.

When the FSM 26a receives a transaction to perform, its identifier is stored in data buffer 28a and additional memory space is allocated in the data buffer for storing the data values retrieved from memory corresponding to the transaction. This additional memory space is typically allocated by the FSM. The FSM executes the transaction by locating the address corresponding to the transaction and requesting the data located at that address. The FSM sends the identifier with the request so that when the data is returned to the FSM, the FSM will match the identifier with the identifier stored in the data buffer and will store the data in the allocated space. Hence, the data is stored in the data buffer location corresponding to the identifier for that transaction.

If the FSM is part of the HAS 30a, then the FSM 26a searches its local memory 16a for the address and retrieves the data. The requests are transmitted and the data is received via memory interface 15. If the FSM is part of the RAS 30b, then the FSM 26b establishes communication with the remote system control unit 14b that owns the memory corresponding to the address of the transaction Once the communication is established, the FSM 26b sends a request for the data located at the address. The request includes the identifier as well as a tag indicating the system control unit that requested the data. When the remote system control unit receives the request it will process the request as if it were a local memory access using its home access service (HAS). Hence, the procedure for retrieving the data from memory by the remote system control unit 14b is similar to the procedure described above for a local memory access of the data by the home system control unit. Once the data is retrieved, it is sent to the FSM of the requesting system control unit that requested the data and the FSM stores the data in the data buffer corresponding to the identifier. The tag directs the data back to the correct requesting system control unit. Once the data has been stored in the data buffer of the requesting system control unit and the transaction is completed, the processor may request the data from its home system control unit.

It is more efficient to separate the data path from control path within the system control unit. When a processor request resulted in data returned, it is more efficient to return the data directly to the processor without passing thru the system control unit FSM. Data paths 30,32 is an example of returning the data to the processor directly from the system interconnect interface bypassing any intermediate system control units and the system control unit FSM. This feature further enhance the speed and efficiency of the computer system.

The foregoing detailed description of the present invention is provided for the purposes of illustration and is not intended to be exhaustive or to limit the invention to the precise embodiment disclosed. Accordingly, the scope of the present invention is defined by the following claims.

What is claimed is:

1. In a computer system comprising first and second processors, a system control unit having first and second finite state machines, and a main memory, a method of processing multiple coherent main memory accesses in parallel, the method comprising:
   transmitting from the first processor to the system control unit a first transaction;
   transmitting from the second processor to the system control unit a second transaction;
   decoding the first and second transactions to determine a first address and a second address, respectively;
   assigning the first and second transactions to a first finite state machine and a second finite state machine, respectively;
   retrieving a first data value corresponding to the first address from the main memory using the first finite state machine; and
   retrieving a second data value corresponding to the second address from the main memory using the second finite state machine, wherein the first and second data values are retrieved in parallel.

2. The method of claim 1, wherein the first and second transactions have a first and a second identifier, respectively, indicating the processor that transmitted the respective transaction.

3. The method of claim 2, further comprising allocating memory spaces in a buffer identified by the first and second identifiers.

4. The method of claim 3, further comprising storing the first and second data values in their allocated memory spaces.

5. The method of claim 4, further comprising transmitting the first data value to the processor that transmitted the transaction.

6. The method of claim 4, further comprising transmitting the second data value to the processor that transmitted the transaction.

7. In a computer system comprising a first and a second processor, a first and a second system control unit, and a local and a remote main memory, a method of executing multiple transactions in parallel, the method comprising:
   transmitting from the first processor to a first system control unit a first transaction;
   transmitting from the second processor to the first system control unit a second transaction;
   decoding the first and second transactions using a decoder to determine a first and a second address, respectively;
   performing a lookup transaction in the decoder for the first address to determine whether the first address is located in the local main memory or the remote main memory;
   wherein if performing the lookup transaction in the decoder determines the first or second address is located in the local main memory, then
      sending the first or second address to a finite state machine of the first system control unit, and
      retrieving local data corresponding to the first or second address from the local main memory using the finite state machine of the first system control unit;
   wherein if performing the lookup transaction in the decoder determines the first or second address is located in the remote main memory, then
      establishing communication between the first system control unit and the second system control unit, sending the first or second address to the second system control unit, and retrieving remote data corresponding to the first or second address from the remote main memory using a finite state machine of the second system control unit; and sending the local and remote data to the first system control unit.

8. The method of claim 7, wherein the finite state machine of the first system control unit monitors the state of the first transaction.

9. The method of claim 7, wherein the finite state machine of the first system control unit monitors the state of the second transaction.

10. The method of claim 7, wherein sending the remote data to the first system control unit is accomplished via a data path that bypasses any intermediate system control unit FSM.

11. The method of claim 7, wherein retrieving the local data and the remote data is performed in parallel.

12. A computer system, comprising:

a plurality of main memories;

a requesting system control unit having a plurality of finite state machines that access the plurality of main memories in parallel, the requesting system control unit being coupled to at least one of the plurality of main memories; and a plurality of processors coupled to the requesting system control unit, that issue transactions to the requesting system control unit for execution by the plurality of finite state machines.

13. The system of claim 12, further comprising a remote system control unit having a plurality of finite state machines and coupled to the requesting system control unit and at least another one of the plurality of main memories.

14. The system of claim 12, wherein the requesting system control unit further comprises a qualifier that determines whether the requesting system control unit can process the transactions.

15. The system of claim 12, wherein each of the plurality of finite state machines executes a single transaction until completed.

16. The system of claim 12, wherein the requesting system control unit further comprises a scheduler that assigns the transaction received from one of the plurality of processors to one of the plurality of finite state machines.

17. The system of claim 12, wherein the requesting control unit further comprises a data buffer for storing the current state of the transactions, the status of data corresponding to the transactions, and identifier information describing which processor issued a particular transaction.

18. The system of claim 12, wherein parallel means simultaneously.

19. The system of claim 12, wherein parallel means overlapping in time.

20. The system of claim 12, further comprising a data path, coupled to the requesting system control unit and the remote system control unit, for bypassing any intermediate system control unit.

* * * * *